Nov. 8, 1949  G. B. SHERMAN ET AL  2,487,735
AUXILIARY TRANSMISSION
Filed March 28, 1946  2 Sheets-Sheet 2
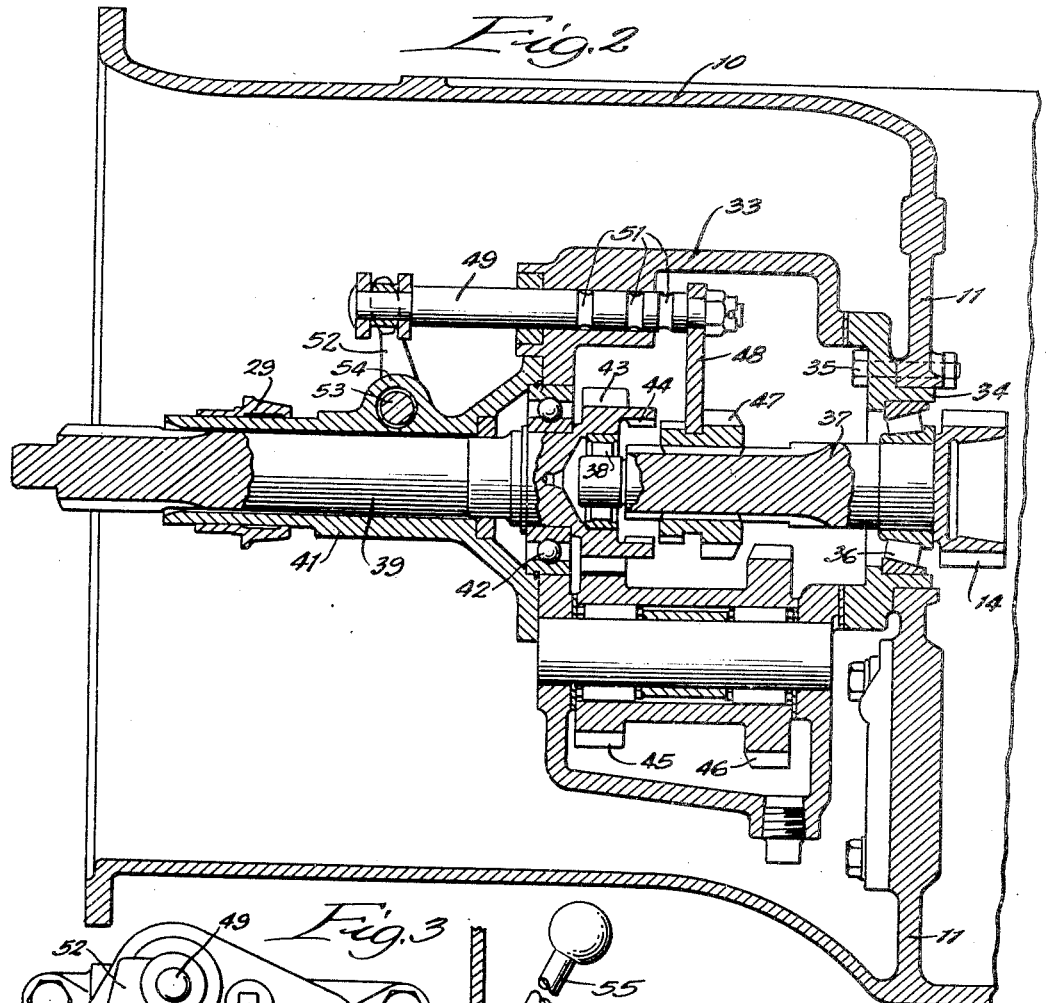
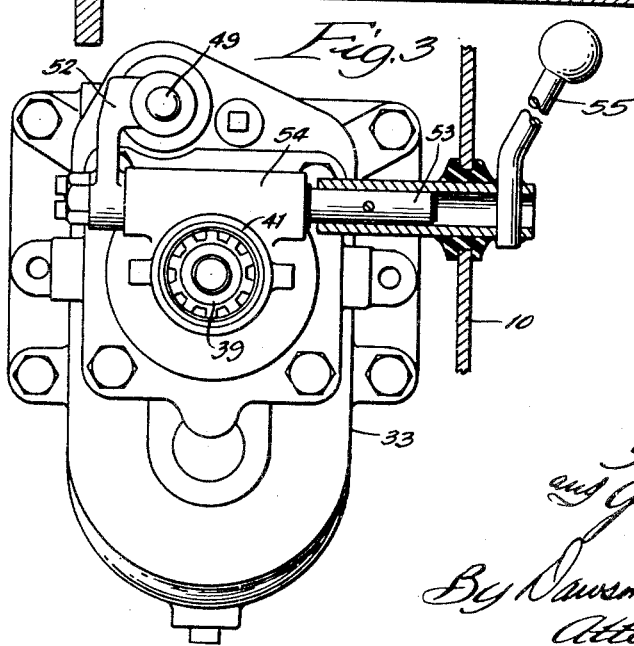

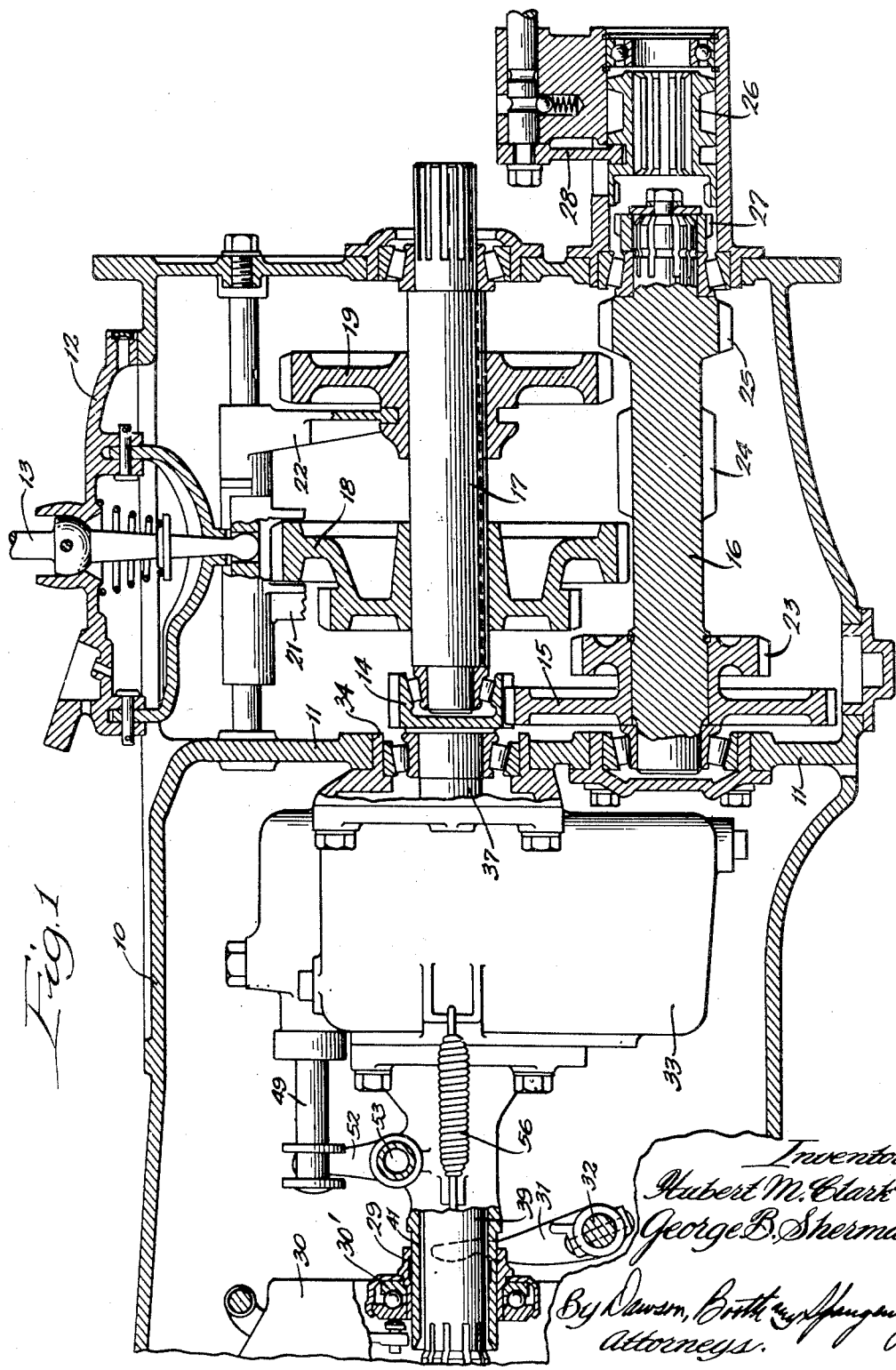

Patented Nov. 8, 1949

2,487,735

UNITED STATES PATENT OFFICE 2,487,735

AUXILIARY TRANSMISSION

George B. Sherman and Hubert M. Clark, Detroit, Mich., assignors, by mesne assignments, to Sherman Industries, Inc., a corporation of Delaware Application March 28, 1946, Serial No. 657,729

5 Claims. (Cl. 74—745)

This invention relates to auxiliary transmissions and more particularly to transmissions for use with tractors and the like to supplement the speed range provided by the usual transmission thereon.

Certain types of tractors being manufactured and sold at the present time are provided with selective three speed forward and reverse transmissions. It has been found that these transmissions do not provide sufficient flexibility of control for the efficient performance of various types of operations ranging from heavy plowing to hauling on highways. These tractors are furthermore equipped with power take-off drives which are ordinarily connected to the transmission countershaft to be driven thereby. For many types of operations the overall gear ratio between the engine and countershaft is too high for efficient use of the power take-off drive. It is accordingly one of the objects of the present invention to provide an auxiliary transmission for use with tractors or the like which can be attached to a tractor to supplement the ratios provided by the standard transmission thereby to increase the flexibility of the tractor. According to one feature of the invention the auxiliary transmission increases the speed of the standard transmission countershaft thereby increasing the power take-off speed.

Another object is to provide an auxiliary transmission which is so constructed that it can be mounted in the standard transmission housing without requiring any rebuilding of the standard transmission parts. In the preferred construction the auxiliary transmission is mounted in that portion of the housing ordinarily occupied by the clutch shaft and replaces the usual clutch shaft.

Still another object is to provide an auxiliary transmission which forms a self-contained unit constructed to be easily mounted in a standard transmission housing.

Still another object is to provide an auxiliary transmission which can easily be shifted to provide driving ratios supplementing those of the standard transmission.

The above and other objects and advantages of the invention will be apparent from the following description when read in connection with the accompanying drawings, in which—

Figure 1 is a partial sectional view through the transmission and transmission housing of a tractor showing the auxiliary transmission of the present invention mounted therein;

Figure 2 is a section through the auxiliary transmission illustrating the mounting thereof in the standard transmission housing; and Figure 3 is an end view with parts in section of the auxiliary transmission.

The transmission of the invention is shown in Figure 1 mounted in a standard conventional tractor structure including a transmission housing indicated generally at 10 divided by a transverse web 11 and carrying at its top a cover plate 12 through which a standard shift lever 13 extends. The transmission is adapted to be driven by a driving gear 14 which meshes a large gear 15 on a countershaft 16. The transmission driven shaft, as shown at 17, has a pilot bearing in the driving gear 14 and has slidably splined thereto a compound gear cluster 18 and a pinion 19. The gear cluster 18 is adapted to be shifted by a fork 21 which is engaged by the shift lever 13, and the pinion 19 may be similarly shifted by a fork 22. When the compound gear is shifted to the left a small pinion part thereon will engage a gear 23 on the countershaft, and when it is shifted to the right, a large gear thereon will engage teeth 24 on the countershaft. This provides two forward speed ratios and a third forward speed ratio may be obtained by shifting the pinion 19 into engagement with a gear 25 on the countershaft. For reverse the pinion 19 may be shifted to the left to engage an idler gear meshing with the teeth 24. Thus the transmission provides three forward speeds and one reverse speed.

As shown, the transmission is provided with a power take-off device including a clutch collar 26 slidably splined on the end of a power take-off shaft, not shown, and formed to engage clutch teeth 27 on the end of the countershaft 16. The clutch collar 26 may be shifted through a yoke 28 either to the disengaged position shown or to a power take-off driving position in which the clutch collar engages the teeth 27 on the countershaft. It will be noted that the countershaft can be driven both when the main transmission is in gear to drive the tractor and when the main transmission is in its neutral position shown to drive only the countershaft.

Drive from the engine of the tractor to the transmission is through a standard friction clutch indicated generally at 30 which is controlled by a clutch throw out ring 30' operated through a collar 29. The collar is engaged by a yoke 31 mounted on a clutch shaft 32 and which may be turned to disengage the clutch. In the standard construction the clutch is connected to the transmission by a clutch shaft which carries a gear similar to the gear 14. With this construction it will be seen that three forward and one reverse driving ratios can be obtained and that the power take-off is driven through only one ratio from the engine.

According to the present invention, the number of driving ratios and the speed of the power take-off can be increased by providing an auxiliary transmission mounted in the standard transmission housing and connecting the clutch to the standard selective transmission. As shown, the auxiliary transmission replaces the usual clutch shaft and comprises a closed housing 33 formed at one end with an outwardly projecting annular flange 34 to fit into an opening in the web 11 which normally carries a bearing for the clutch shaft. The casing 33 may be accurately located by the flange 34 and may be secured in place by cap screws 35 which thread into tapped openings in the web 11 to secure the casing thereto. The flange 34 may be of a size and shape to replace the standard bearing ring normally fitting into the web opening so that no changes in the transmission housing are required to mount the auxiliary transmission.

The flange 34 carries a bearing 36 which supports a driven shaft 37 on which the driving gear 14 is carried. The shaft 37 extends into the casing and is supported at its opposite end by a pilot bearing 38 in the end of a driving shaft 39. The driving shaft extends through an elongated sleeve 41 secured to the casing 33 and may be supported by a bearing 42 in the casing. At its inner end the driving shaft 39 carries a driving gear 43 formed with a clutch flange 44. The gear 43 meshes with a gear 45 on a countershaft which also carries a gear 46. A shiftable gear element 47 is splined on the driven shaft 37 and is formed at one end with a clutch part to engage the clutch flange 44 directly to connect the shafts. The member 47 also has a pinion part adapted to mesh with the gear 46. As shown, the gears 43 and 45 are the same size and gear 46 is larger than gear 47 so that the driven shaft will rotate faster than the driving shaft when gears 46 and 47 are in mesh.

The gear member 47 may be shifted by a yoke 48 carried by a shift rod 49 which is slidable in the casing 33. The rod 49 may be formed with annular grooves 51 to be engaged by the usual spring detent to hold the rod in any one of three positions to provide neutral, direct drive or over drive. The rod is adapted to be shifted by a shift arm 52 connected to the rod and carried by a shifter shaft 53 which is journaled in a boss 54 on the sleeve 41. The shaft 53 extends through an opening in the side of the transmission housing 10 and carries a shift lever 55 lying adjacent the side of the transmission housing for easy access by an operator. For installation of the auxiliary transmission of the invention, it is necessary to drill a hole through the transmission housing for the shaft 53, this being the only change in the standard construction required.

At its outer end the driving shaft 39 is formed to connect to the clutch 30 in the same manner as the standard clutch shaft. When the auxiliary transmission is installed, the clutch collar 29 may be slidably mounted on the end of the sleeve 41 and springs 56 may be provided connected to the casing 33 and to the clutch collar to urge it to clutch engaging position.

It will be seen that the auxiliary transmission of the present invention can be easily and quickly installed on a standard tractor with a minimum of changes in the standard tractor construction. When so installed the auxiliary transmission will double the number of driving ratios provided by the standard transmission thereby increasing the flexibility of the tractor and further enabling the speed of the power take-off to be increased.

In a typical installation the standard transmission provides three forward speeds at an engine speed of 1400 R. P. M. of respectively 2.51, 3.23 and 7.48 miles per hour. With the auxiliary transmission installed these ratios are all retained when the auxiliary transmission is connected for direct drive. In addition by providing an auxiliary transmission ratio of 1.56:1 when the gears 46 and 47 are in mesh, tractor speeds of 3.92, 5.04 and 11.68 miles per hour are provided. It will be seen that these ratios are highly desirable for many types of operations where a speed of more than three and less than seven miles per hour are desired as, for example, in certain cultivating and like operations. The maximum ratio providing 11.68 miles per hour is also highly useful for such operations as hauling where a relatively high speed is desirable. In addition to these advantages the supplemental transmission enables the power take-off to be operated approximately one and one-half times as fast as the standard power take-off which is extremely useful for various types of uses.

While one embodiment of the invention has been shown and described in detail, it will be understood that this is illustrative only and is not to be taken as a definition of the scope of the invention, reference being had for this purpose to the appended claims.

What is claimed is:

1. An auxiliary transmission for use on a tractor having a driving motor, a transmission housing, a selective transmission in the housing, a clutch, and a clutch shaft connecting the clutch to the transmission, the auxiliary transmission being formed to replace the clutch shaft and comprising a casing, a closure plate detachably connected to one end of the casing, an annular projecting flange on the closure plate adapted to fit into an opening in the housing through which the clutch shaft normally extends thereby to mount the closure plate, means to connect the casing to the closure plate, a driven shaft extending through said flange, a driving shaft aligned with the driven shaft and extending from the opposite end of the casing and adapted to connect to the clutch, gearing in the casing to connect the shafts, a sleeve on the casing in which the driving shaft is journaled, and shift means to shift the gearing thereby to change the driving ratio between the shafts.

2. An auxiliary transmission for use on a tractor having a driving motor, a transmission housing, a selective transmission in the housing, a clutch, and a clutch shaft connecting the clutch to the transmission, the auxiliary transmission being formed to replace the clutch shaft and comprising a casing, an annular projecting flange at one end of the casing, adapted to fit into an opening in the housing through which the clutch shaft normally extends thereby to mount the casing, a driven shaft extending through said flange, a driving shaft aligned with the driven shaft and extending from the opposite end of the casing to connect to the clutch, gearing in the casing and adapted to connect the shafts, an elongated sleeve carried by the casing around the driving shaft, a clutch collar slidable on the sleeve to control the clutch, a shifter shaft pivoted on the sleeve of a length to extend through the housing, and means including a shift rod extending into the casing connecting the shifter shaft to the gearing to shift it.

3. In combination with a tractor having a driving motor, a clutch connected to the motor, a transmission housing, a selective gear transmission in the housing including a driving gear, a countershaft connected to the driving gear, a driven shaft, and shiftable gear means to connect the driven shaft to the countershaft, and a power take-off device connected to the countershaft, an auxiliary transmission connecting the clutch to the driving gear and comprising a casing, means on the casing to mount it in the transmission housing, an auxiliary driven shaft extending from one end of the casing and carrying the driving gear, an auxiliary driving shaft extending from the other end of the casing to connect to the clutch, and shiftable gearing in the casing to connect the auxiliary driving and driven shafts directly or to drive the auxiliary driven shaft faster than the auxiliary driving shaft thereby to turn the driving gear at a speed in excess of engine speed.

4. An auxiliary transmission for use with tractors or the like comprising a casing, an annular flange projecting from one end of the casing for mounting it in a transmission housing, an elongated sleeve projecting from the other end of the casing coaxial with the flange, a driven shaft extending through the flange and carrying a transmission driving gear outside of the casing, a driving shaft extending through the sleeve, shiftable gear means in the casing to connect the driving and driven shafts, a shift rod slidable in the casing to shift the gearing, and a shift crank pivoted on the sleeve and connected to the rod to shift it.

5. An auxiliary transmission for use with tractors or the like, comprising a casing, an annular flange projecting from one end of the casing for mounting it in a transmission housing, an elongated sleeve projecting from the other end of the casing coaxial with the flange, a driven shaft extending through the flange and carrying a transmission driving gear outside of the casing, a driving shaft extending through the sleeve, the driving shaft extending beyond the sleeve and being formed for connection to a clutch, the sleeve being formed slidably to support a clutch operating collar, shiftable gear means in the casing to connect the shafts, and means to shift the gear means to change the driving ratio between the shafts.

GEORGE B. SHERMAN.
HUBERT M. CLARK.

REFERENCES CITED

The following references are of record in the file of this patent:

UNITED STATES PATENTS

| Number | Name | Date |
| --- | --- | --- |
| 1,782,184 | Wells | Nov. 18, 1930 |
| 2,085,805 | Jessen | July 6, 1937 |
| 2,135,042 | Rossman | Nov. 1, 1938 |
| 2,231,966 | Swennes | Feb. 18, 1941 |
| 2,241,002 | Peterson | May 6, 1941 |

FOREIGN PATENTS

| Number | Country | Date |
| --- | --- | --- |
| 301,232 | Italy | Sept. 29, 1932 |